(12) United States Patent
Murphy et al.

(10) Patent No.: US 9,069,665 B2
(45) Date of Patent: *Jun. 30, 2015

(54) SYSTEM AND METHOD FOR DEFINITION, CREATION, MANAGEMENT, TRANSMISSION, AND MONITORING OF ERRORS IN SOA ENVIRONMENT

(71) Applicant: eBay Inc., San Jose, CA (US)

(72) Inventors: Ronald Francis Murphy, Pleasanton, CA (US); Sastry K. Malladi, Fremont, CA (US); Weian Deng, Sunnyvale, CA (US); Abhinav Kumar, San Jose, CA (US); Bhaven Avalani, Cupertino, CA (US); Arun Raj Mony, Chennai (IN)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/850,021

(22) Filed: Mar. 25, 2013

(65) Prior Publication Data

US 2013/0290794 A1 Oct. 31, 2013

Related U.S. Application Data

(63) Continuation of application No. 12/766,712, filed on Apr. 23, 2010, now Pat. No. 8,407,520.

(51) Int. Cl.
*G06F 11/07* (2006.01)
*H04L 12/24* (2006.01)

(52) U.S. Cl.
CPC ........ *G06F 11/0766* (2013.01); *G06F 11/0709* (2013.01); *G06F 11/0769* (2013.01); *H04L 41/0681* (2013.01); *H04L 41/5038* (2013.01)

(58) Field of Classification Search
CPC ..... H04L 1/004; H04W 4/12; G06F 11/0766; G06F 11/0769; G06F 11/2012; G06F 3/067
USPC ................................. 714/26, 48, 57
See application file for complete search history.

(56) References Cited

U.S. PATENT DOCUMENTS

| | | | |
|---|---|---|---|
| 5,892,898 A | 4/1999 | Fujii et al. | |
| 6,243,778 B1 * | 6/2001 | Fung et al. | 710/113 |

(Continued)

FOREIGN PATENT DOCUMENTS

WO WO 2009034512 A2 * 3/2009

OTHER PUBLICATIONS

"U.S. Appl. No. 12/766,712, Non Final Office Action mailed Mar. 7, 2012", 7 pgs.

(Continued)

*Primary Examiner* — Loan L. T. Truong
(74) *Attorney, Agent, or Firm* — Schwegman Lundberg & Woessner, P.A.

(57) ABSTRACT

A computer-implemented system and method for the definition, creation, management, transmission, and monitoring of errors in a SOA environment. An example embodiment includes: defining a common standard error data structure; automatically generating a unique identifier (ID) for each new error data instance; allowing customization of error data structure through extensions; creation and management of error instances that conform to this structure; ability to group errors across various dimensions; introducing the concept of an error library, the error library including a plurality of localizable error bundles, each of the error bundles including a plurality of error data instances for a particular domain, along with the associated metadata; automatically creating runtime artifacts for each error; ability to transmit errors either as faults or as part of the normal response payload; automatic error metric collection based on various error categories, and finally, tooling to help manage error libraries and reporting errors.

19 Claims, 14 Drawing Sheets

(56) References Cited

U.S. PATENT DOCUMENTS

| | | | |
|---|---|---|---|
| 6,269,460 B1* | 7/2001 | Snover | 714/48 |
| 6,446,058 B1* | 9/2002 | Brown | 706/60 |
| 6,526,524 B1* | 2/2003 | Kelley | 714/38.1 |
| 6,526,529 B1* | 2/2003 | Miksovsky et al. | 714/57 |
| 6,829,527 B2 | 12/2004 | Felke et al. | |
| 7,076,695 B2* | 7/2006 | McGee et al. | 714/47.2 |
| 7,870,550 B1* | 1/2011 | Qureshi et al. | 717/174 |
| 7,954,090 B1* | 5/2011 | Qureshi et al. | 717/127 |
| 8,407,520 B2 | 3/2013 | Murphy et al. | |
| 2002/0123983 A1 | 9/2002 | Riley et al. | |
| 2003/0040878 A1* | 2/2003 | Rasmussen et al. | 702/85 |
| 2005/0028145 A1 | 2/2005 | Kang et al. | |
| 2005/0154940 A1* | 7/2005 | Umeda | 714/25 |
| 2005/0262379 A1* | 11/2005 | Visser | 714/4 |
| 2007/0124718 A1* | 5/2007 | Kobayashi et al. | 716/19 |
| 2007/0142029 A1* | 6/2007 | Willehadson et al. | 455/405 |
| 2007/0174654 A1* | 7/2007 | Berman et al. | 714/2 |
| 2008/0148110 A1* | 6/2008 | Bhamidipaty et al. | 714/57 |
| 2008/0228338 A1* | 9/2008 | Howard et al. | 701/29 |
| 2008/0276128 A1* | 11/2008 | Lin et al. | 714/45 |
| 2009/0013208 A1* | 1/2009 | DiMuzio | 714/2 |
| 2009/0043883 A1* | 2/2009 | Aydt et al. | 709/224 |
| 2009/0219567 A1 | 9/2009 | Ishizaki | |
| 2009/0249244 A1 | 10/2009 | Robinson et al. | |
| 2009/0291512 A1 | 11/2009 | Izuha et al. | |
| 2010/0070448 A1 | 3/2010 | Omoigui | |
| 2010/0115348 A1* | 5/2010 | Gilluwe | 714/57 |
| 2010/0153920 A1 | 6/2010 | Bonnet et al. | |
| 2010/0192025 A1* | 7/2010 | Limprecht et al. | 714/48 |
| 2010/0275054 A1 | 10/2010 | Grace et al. | |
| 2011/0047418 A1 | 2/2011 | Drees et al. | |
| 2011/0126061 A1* | 5/2011 | Worner et al. | 714/57 |
| 2011/0154379 A1* | 6/2011 | Gamanho | 719/330 |
| 2011/0184990 A1 | 7/2011 | Murphy et al. | |
| 2011/0264964 A1* | 10/2011 | Murphy et al. | 714/48 |
| 2011/0302192 A1* | 12/2011 | Bariska et al. | 707/769 |
| 2012/0151278 A1* | 6/2012 | Tsantilis | 714/48 |

OTHER PUBLICATIONS

"U.S. Appl. No. 12/766,712, Notice of Allowance mailed Nov. 26, 2012", 8 pgs.

"U.S. Appl. No. 12/766,712, Response filed Aug. 6, 2012 to Non Final Office Action mailed Mar. 7, 2012", 11 pgs.

* cited by examiner

```
<complexType name="ErrorData">
  <sequence>
    <element name="errorId" type="long"/>
    <element name="errorName" type="string"/>
    <element name="severity" type="tns:ErrorSeverity"/>
    <element name="category" type="tns:ErrorCategory"/>
    <element name="organization" type="string"/>
    <element name="domain" type="string"/>
    <element name="subdomain" type="string" minOccurs="0"/>
    <element name="message" type="string"/>
    <element name="cause" type="string" maxOccurs="1" minOccurs="0"/>
    <element name="resolution" type="string" maxOccurs="1" minOccurs="0"/>
    <element name="exceptionId" type="string"/>
    <element name="parameter" type="tns:ErrorParameter" minOccurs="0" maxOccurs="unbounded"/>
  </sequence>
</complexType>
```

Figure 1

New Error
Create a new error

| Field | Value |
|---|---|
| Error Library: | NewErrorLibrary009ErrorContent |
| Domain | NewErrorDomain02 |
| Organization: | Marketplace |
| Content Structure | |
| Error ID: | 103003 |
| Name: | NewError |
| Sub Domain | Buying |
| Message: | Some other message |
| Resolution | |
| Category | APPLICATION |
| Severity: | WARNING |

Browse...

Finish   Cancel

Figure 7

```
public interface ErrorIdGenerator {

/**
     * The Builder defines an interface for specifying characteristics/attributes.
     * It helps solve the telescoping constructor problem by splitting up the construction
     * process into discrete, but easily aggregatable steps
     *
     */
    interface Builder {

/**
         * A backing store neutral way of defining the location where error ids are
         * maintained
         * @param storeLocation
         * @return this
         */
        public Builder storeLocation( String storeLocation );
        public Builder credentials( String username, String password );
        public Builder organizationName( String organizationName );
        public Builder blocksize( int blocksize );
        public ErrorIdGenerator build();
    };

/**
     * Obtain the next error id
     *
     * @param domain
     * @return the next error id for this domain
     * @throws IllegalArgumentException if the domain required creation and the blocksize
     * was not valid
     * @throws LoadException if there was a problem accessing the store location
     * @throws StoreException if there was a problem committing the changes to
     * the store location
     */
    public long getNextId( String domain ) throws LoadException, StoreException;
};
```

Figure 11

SYSTEM AND METHOD FOR DEFINITION, CREATION, MANAGEMENT, TRANSMISSION, AND MONITORING OF ERRORS IN SOA ENVIRONMENT

PRIORITY

This application is a Continuation of and claims the benefit of priority to U.S. patent application Ser. No. 12/766,712, entitled "SYSTEM AND METHOD FOR DEFINITION, CREATION, MANAGEMENT, TRANSMISSION, AND MONITORING OF ERRORS IN SOA ENVIRONMENT," filed on Apr. 23, 2010, which is hereby incorporated by reference herein in its entirety.

BACKGROUND

1. Copyright Notice

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008-2010, eBay Inc., All Rights Reserved.

2. Technical Field

This disclosure relates to methods and systems supporting computing and data processing systems. Specifically, the disclosure relates to definition, creation, management, transmission, and monitoring of errors in a Services Oriented Architecture (SOA) environment.

3. Related Art

In SOA, there are typically many communicating reusable services that are deployed in several machines. In large-scale enterprises, like eBay, eTrade, or Google, for example, there could be thousands of different services deployed in thousands of machines. It is most common and efficient for these automated services to communicate with each other. Further, external access is also typically provided for some of these services. In communicating with each other, various different types of communication protocols may be used for efficiency and optimization reasons. Communication between service providers and service consumers can be accomplished using some pre-defined protocol. In the web services case, this protocol can be the Simple Object Access Protocol (SOAP). SOAP is a protocol for exchanging Extensible Mark-up Language (XML)-based messages over computer networks, normally using Hypertext Transport Protocol (HTTP/HTTPS).

No matter how perfectly software is implemented, often times, certain things go wrong and we need a simple and clear mechanism to communicate exactly what went wrong to the callers/users. It is also vital that we need to standardize and follow a common mechanism for describing not only what an error means, but also to propagate such messages consistently and uniformly to the callers. Errors are essentially a result of abnormal processing of the request. This could be due to invalid input/request from the caller, or due to some business error or unexpected system errors. Regardless of what the error is, we need a consistent way to define, create, manage, and transmit the details of the error, to enable service developers and service consumer developers to do error processing efficiently.

In a SOA environment, service errors can be defined as any condition indicating complete or partial failure of a service operation, regardless of how this condition is signaled in the whole service processing flow. In this sample definition, service errors in SOA can come in two forms:
- Faults: Declared in the Web Services Description Language (WSDL) as Fault messages and transmitted from services to consumers in a out of band payload. In the case of SOAP protocol, it is the SOAPFaults, transmitted as exceptions in Java language bindings;
- Response-Resident Errors (RRE): Errors transmitted as part of the normal response payload of operation execution.

In both of these scenarios, the structure of the error can be commonly defined for uniformity, consistency and for uniquely identifying errors across an organization. These errors can be originated from:
- The service implementation when the service application business logic detects application errors, and
- The SOA runtime when it detects system level errors.

In the absence of special measures (e.g., modeling techniques/implementation enhancements, etc.), there can be a divergent processing flow for service errors. This complicates client processing, especially for non-SOA clients and for 3rd party coders; because, in most cases, processing flows must be anticipated. Additionally, for response-resident errors, in the absence of additional framework or application implementation, most of the SOA value-added processing is missed. A framework is a system, such as an application, within which a error processing mechanism is implemented.

Thus, a computer-implemented system and method for the definition, creation, management, transmission, and monitoring of errors in a SOA environment is needed.

BRIEF DESCRIPTION OF THE DRAWINGS

Embodiments illustrated by way of example and not limitation in the figures of the accompanying drawings, in which:

FIG. 1 illustrates schema of the common error data type—(ErrorData) in an example embodiment;

FIG. 7 illustrates an example embodiment for creating an error type;

FIG. 11 illustrates an example of the Error Id Generator interface in an example embodiment;

FIG. 14 shows a diagrammatic representation of a machine in the form of a computer system within which a set of

DETAILED DESCRIPTION

Figure 2:
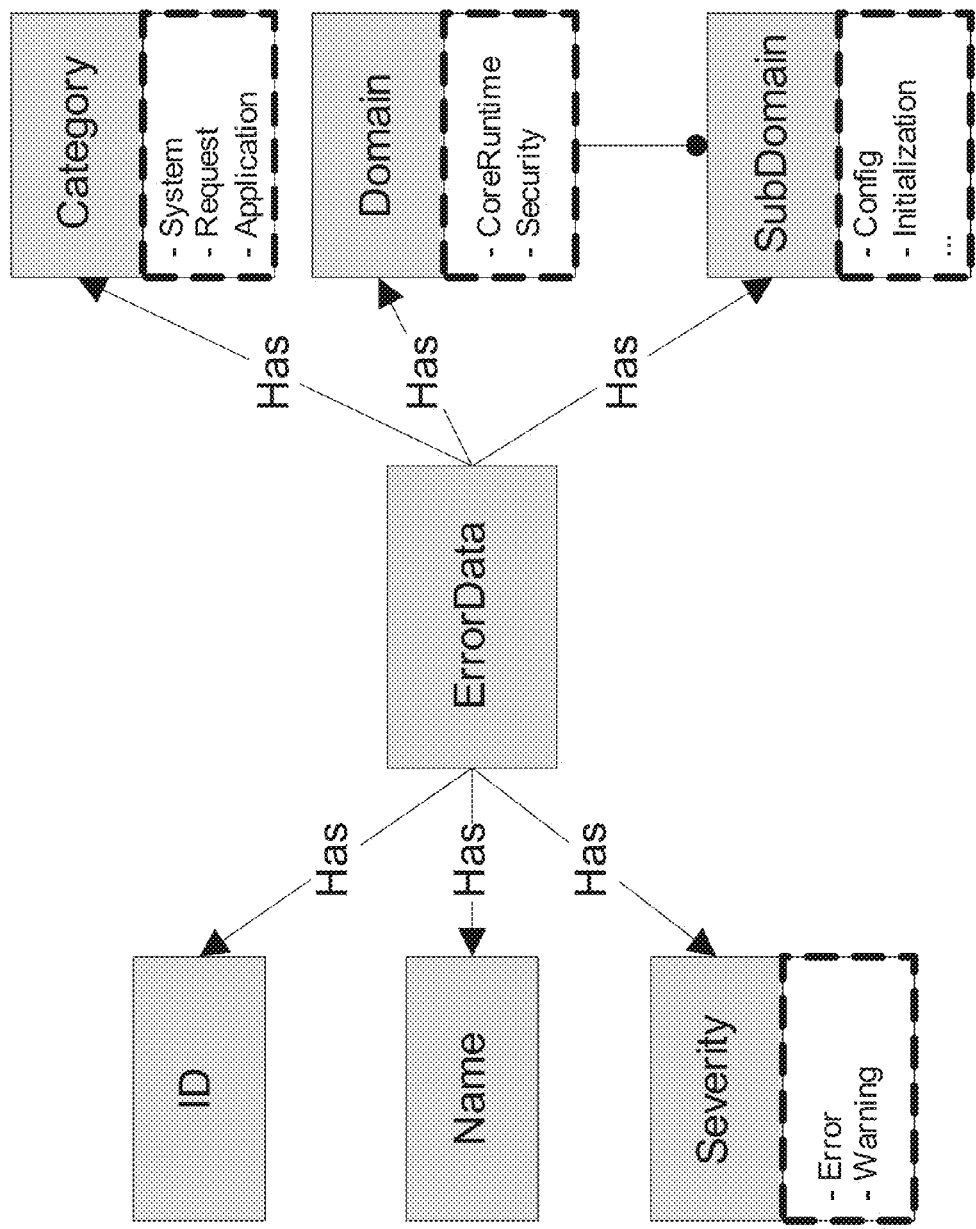
FIG. 2 illustrates the ErrorData model in an example embodiment.

In the following description, for purposes of explanation, numerous specific details are set forth in order to provide a thorough understanding of some example embodiments. It will be evident, however, to one of ordinary skill in the art that the present invention may be practiced without these specific details.

As described further below, according to various example embodiments of the disclosed subject matter described and claimed herein, there is provided a computer-implemented system and method for the definition, creation, management, transmission, and monitoring of errors in a SOA environment. Various embodiments are described below in connection with the figures provided herein. The error processing techniques described herein are primarily used in the context of SOA services, although the techniques are not limited to SOA services.

Error processing is an important aspect of service invocation in the SOA paradigm. The SOAP and WSDL standards, and some distributed paradigms before SOAP technology such as CORBA, employ an exception pattern around the definition and runtime propagation of error information. In the exception pattern, errors become serializable data types, and are associated to an out-of-band error communication flow—the SOAP Fault flow, in the case of SOAP. Possible errors for each service operation are described in wsdl:fault definitions in the WSDL that defines a service. This conventional mechanism has a number of limitations:

1. The number of distinct error situations in typical service-enabled business logic can easily get into the hundreds, and this degree of multiplicity is tedious to express in WSDL.

2. The very exception-based nature of SOAP faults makes them all-or-nothing in their effect on an operation's control flow: typically they block further activity, making warnings and partial success (partial results) impossible.

3. Modeling of "error information within the normal "response-band" service data is expressly excluded by the SOAP fault pattern, and the standard provides no guidance as to how to unify response-band and error-band information.

4. Because of the lack of standardization around individual error case definition and around unified response/error flow modeling of errors, there is also no WSDL standards compliant tooling in the industry to provide comprehensive management of the definition, creation, management, and transmission of errors.

In various example embodiments described herein, error processing techniques for services (and framework) are described. These error processing techniques describe how errors are defined, managed, localized and propagated to the callers, what necessary tooling is required to enable this error processing, and finally how an error management sub-system interacts with the rest of the SOA system and tooling.

Many conventional systems do not support a formal error identifier (ID) or error messages management mechanism. Clean declaration of errors and their management is important for Services in a SOA environment, because service consumers and service providers are isolated. Therefore, the contract needs to have sufficient information to consumer the service including error information. Lack of a mechanism and tooling to formally define and manage those errors would lead to in-effective and inconsistent use of services, including interoperability issues.

Error Definition

Before describing how errors are defined, managed and propagated, we will describe the composition of a typical error message in an example embodiment. In a particular embodiment, the framework can define a standard error message definition that is commonly used across the system.

The following can be the definition of the common base error data type—(ErrorData) in an example embodiment. For example, see also FIGS. 1 and 2.

Error ID: is a unique number that identifies the error.

Error Name: A human readable error name in string format.

Organization: The name of the organization from which the errors come from.

Category: An error classification with the suggested values of SYSTEM, APPLICATION and CLIENT. Category indicates whether the error occurred in system, application or the client code.

Domain: This is a field that indicates specific group within the organization. Example values include "TRADING", "SEARCH", "SECURITY", "BILLING", etc.

sub-domain: This is a field which further helps to indicate a subsystem within a domain. For example, for System domain, sub-domain can include "Initialization", "(De) Serialization", "Authentication", "Authorization", etc.

Severity: This is a field that indicate the severity of an error. Possible values include—INFO, DEBUG, WARNING, CRITICAL.

Message: This is the language specific error message string that can also be parameterized.

Resolution: This is a field which can either contain further explanation of the error message or can contain some proposed remedy. The combination of this resolution string and the message string above, can be treated as a "long error message"

Cause: This is a field that contains the reason for the error, including any stack trace in Java environment, etc. This can be simply a text string. The framework doesn't need to dictate any specific format.

ExceptionName: A language specific field containing additional information to help reconstructing Fault at the other end.

All of the above fields are statically defined for any given error message, except for the message parameters, if any, and the Cause field. Cause, Resolution, and sub-domain are optional.

Localization

Error messages also need to be localizable. How those error messages are localized is specific to a particular embodiment. This can be achieved through Property Resource Bundles in a particular embodiment. These Resource bundles should be included in an Error Library, as described in more detail in later sections.

Error Categories

There are three categories of errors: SYSTEM, APPLICATION and CLIENT. SYSTEM errors are the errors generated by framework independent of any application logic. APPLICATION errors are the errors generated by service implementation. CLIENT errors are errors generated due to invalid or insufficient input sent from the client to the service. However, all the errors are handled the same way.

Customization of Error Types

Occasionally, there may be a need for service developers to customize the standard error message definition. To accommodate this, the framework and the tooling can allow customization of the error message definition. The framework can define a common base error type definition, hereafter referred to as ErrorData. All errors can use the same Error- Data definition, by default. Services can optionally define a derived type (only extension) to include additional information.

The wire format for these custom errors could be either as exactly defined in the derived type or a custom error handler can be supplied to map the errors as necessary in an example embodiment.

When an error is defined as part of a normal payload response, it is suggested a top level element to be used to easily identify errors in the response for system error processing. This is useful for example to collect various error metrics by the system while processing the errors.

This ErrorData data type structure, as described above, can be defined as a schema type in a common namespace (e.g., http://www.host.com/services) and reused across all services in their own respective namespaces.

It is also possible to return more than one error (i.e., ErrorData) to the caller, on any given operation invocation. Using the ErrorData structure defined above, many actual instances of error messages can be created. These error messages can be used by services (or the framework as the case may be), at runtime to indicate what has gone wrong. We need to be clear about the distinction between the structure of the error type and the actual instances of error messages. The actual instances of error messages also need to be managed. Here a construct called Error Library is introduced to manage and maintain the error instance definitions. The anatomy of this ErrorLibrary is described in a later section herein.

Error ID Management

The Error ID, as defined in the ErrorData structure described above, must be unique across all errors within an organization, so we can distinguish one error from another. Sufficient tooling can support generating these unique Error ID's as part of the overall error processing system. Users or applications (i.e., entities defining the error messages themselves) don't need to be concerned about the actual Error ID numbers or how to generate them.

Figure 9:
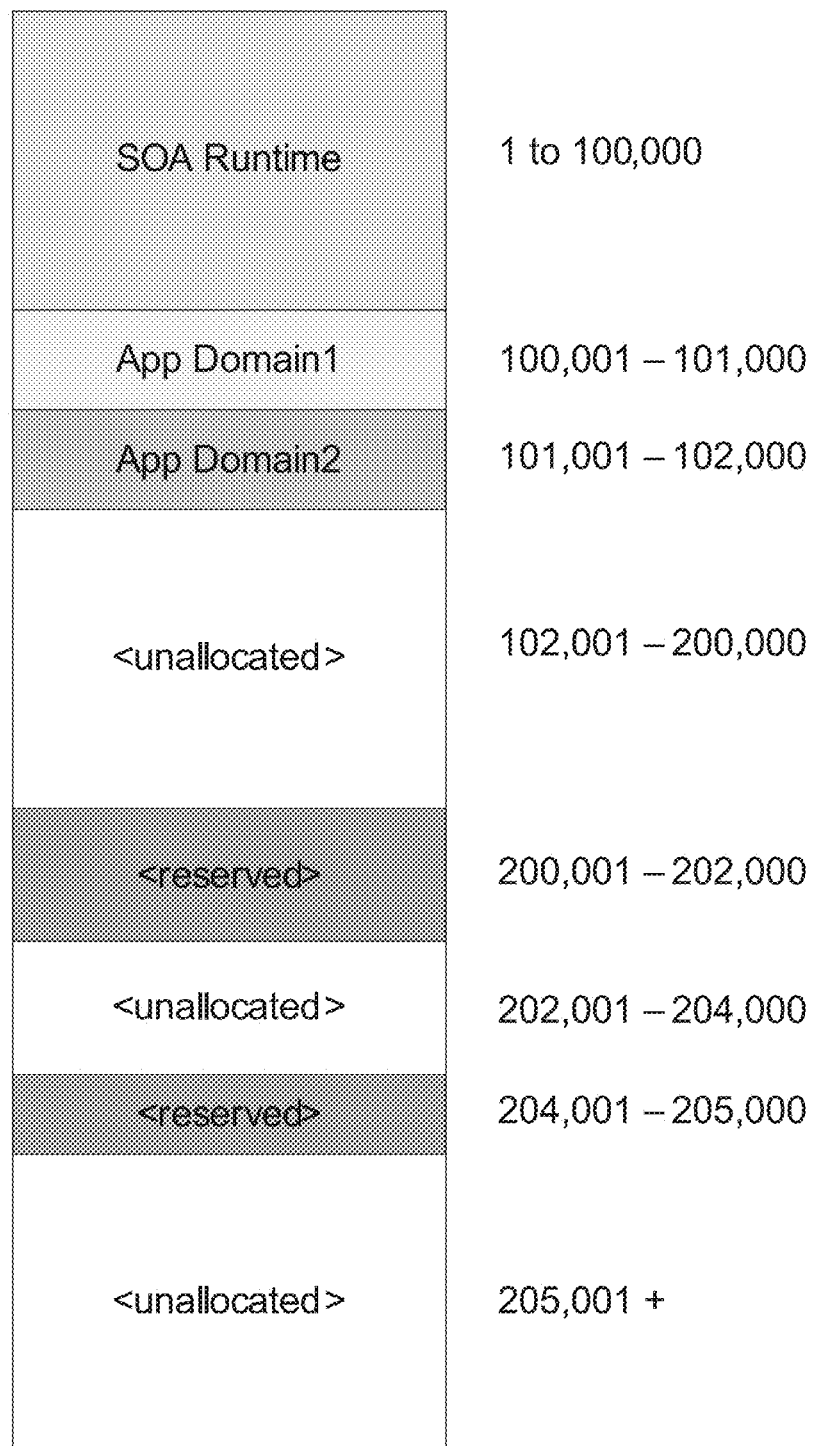
FIG. 9 illustrates the error ID space in an example embodiment.

In an example embodiment, one can reserve special ranges for different categories of errors belonging to separate domains, to make the management easier. For example, system errors could reserve a range of 1-10,000 and application errors could have a range from 10,000-100,000. For example, see the embodiment shown in FIG. 9.

Error Id Generator

Figure 10:
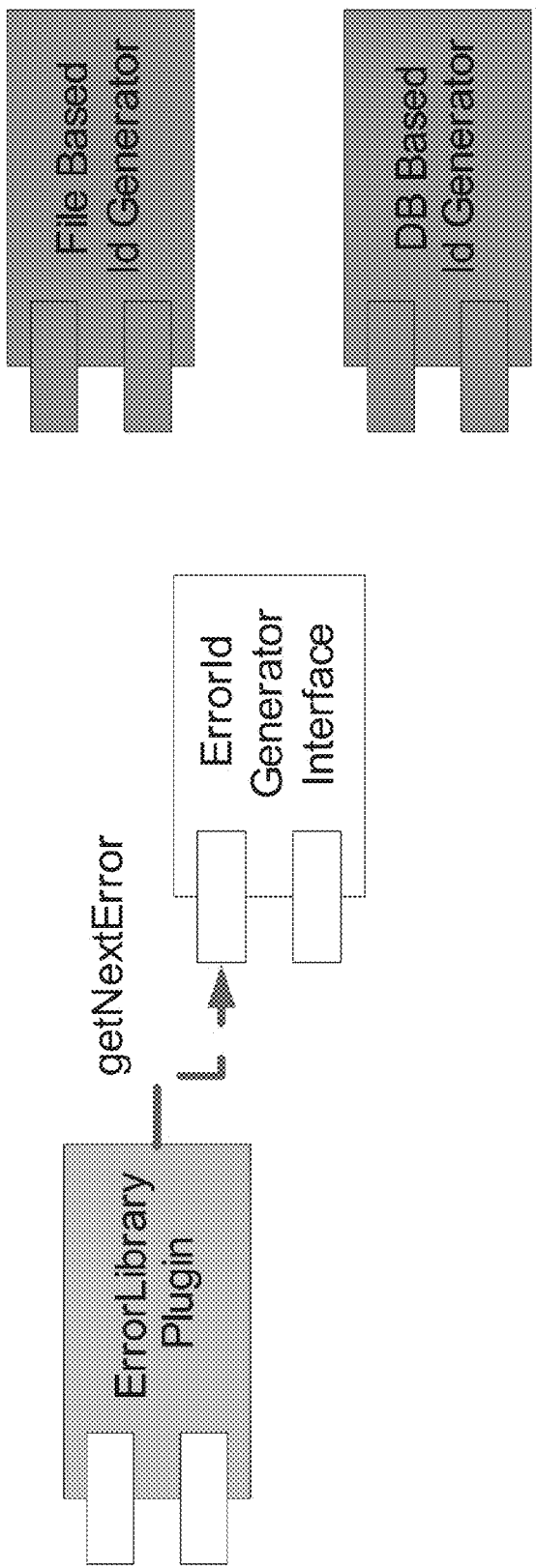
FIG. 10 illustrates the components involved during the pluggable error ID generation process in an example embodiment.

The Error Id Generator refers to a component that is responsible for creating unique error IDs. An interface called ErrorIDGenerator is defined and different implementations of this interface can be plugged in. For example, one implementation may use a data base sequence generator. The error creating tooling calls this generator to get the next unique error ID while creating an error. For example, see FIGS. 10-11.

Client Side Retries

For system errors, in an example embodiment, there can also be a facility to configure a client to automatically retry the invocation for specific errors. This capability may not make sense for application errors; because, an automatic retry may not make sense for an application error and often requires a change in the request of some sort.

Error Metrics

In an example embodiment, metrics can be defined and collected for specific errors. For example, metrics can be collected that define the number of errors that occurred when invoking a specific service, specific operation, categorized by various dimensions like client ID, or application ID. In addition, metrics can be collected that measure counts on error categories: System, Application, and Client. For example, metrics can be collected that can be used to determine that a specific operation invocation has X number of errors, but also to measure that out of these X number of errors, Y are system errors and Z are application errors. Additionally, the metrics provide information that specifies that within the Z application errors how many are "001—Invalid Input" errors, how many are "002—Can't find item" errors, etc. Further, metrics can be collected that are based on error domains. Also, metrics can be collected that measure counts of errors by severity. It can be implemented as either one metric for severity or one metric for all severities and use components to indicate counts for individual severities. Thus, errors can be sliced and diced, and reported in many different dimensions. In a particular embodiment, this metrics collection can be done by configuring a handler in SOA runtime.

In order to measure the error metrics in the different dimensions of errors, a particular embodiment provides a mechanism in "Response Pipeline handler" that checks for whether an error is part of a response and accordingly updates the respective metrics. This handler can get the information from the type mappings file. Once error information is collected from the RRE, appropriate error metrics, as defined in the section above, can be updated. Once the error metrics are defined and collected, alert conditions can be defined for those, using a centralized alerting framework. This mechanism can be used to collect error metrics both on the server side and client side.

Custom Error Mapping

Even though the format and structure is pre-defined for errors, sometimes there is a need to map that pre-defined structure to an existing error format, for legacy reasons. A particular embodiment can provide custom error mapping feature to allow such mappings.

Error Logging and Reporting

A particular embodiment can provide a centralized alerting function based on error metrics. Errors can be logged as events. Error events can be sampled and logged. It may not be necessary to log every event; because, the volume may be quite high. The error sampling frequency can be configurable with a default. For example, the default error sampling frequency can be as follows: once an error of a particular type occurs, log the error and then don't log the error for the next 10 occurrences of the same kind of error.

The Error Library

Figure 3:
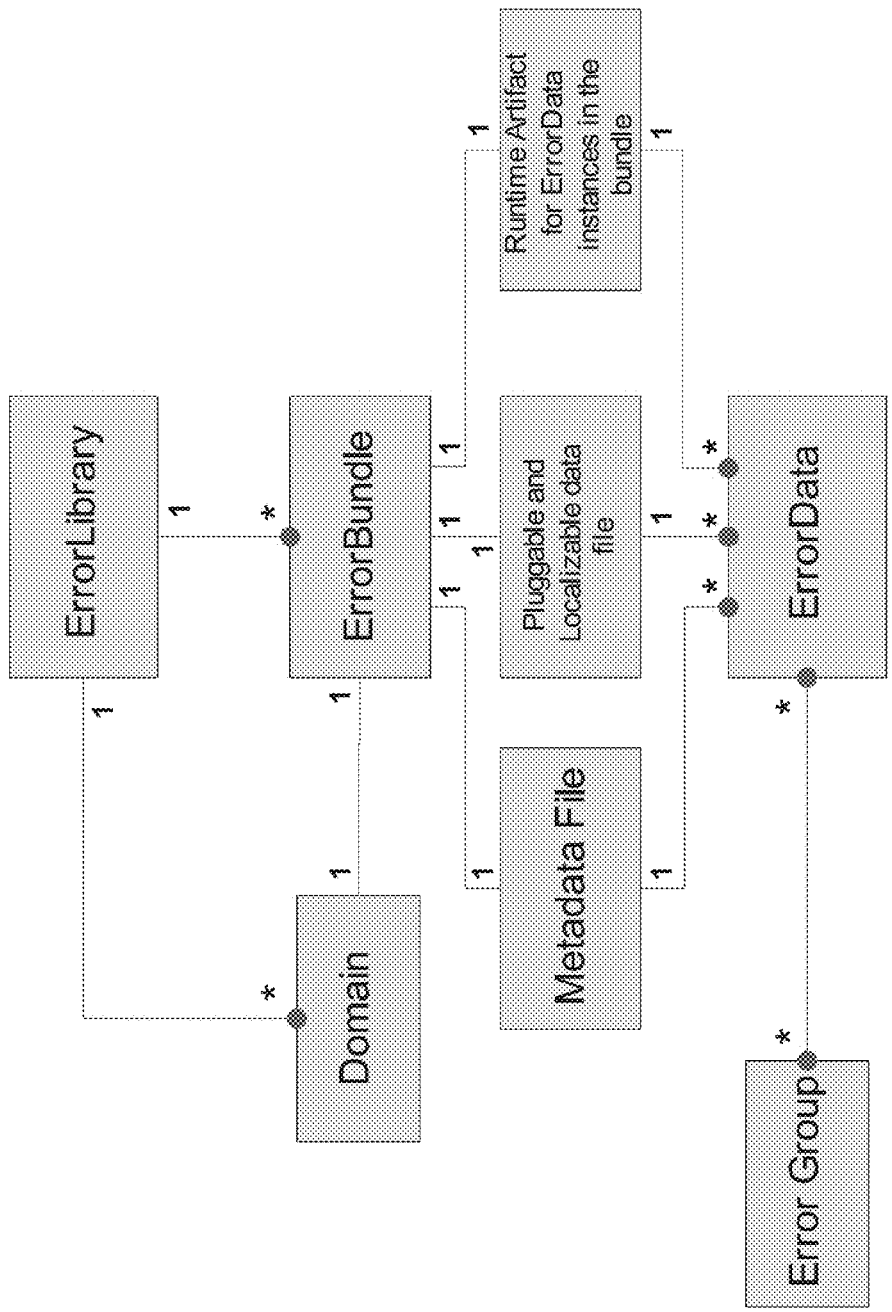
FIG. 3 illustrates the ErrorLibrary model in an example embodiment.

Example embodiments provide a mechanism for creating and managing the actual instances of error messages. A concept of the Error Library is provided for this purpose. For example, see FIG. 3.

An Error Library is a collection of logically related errors that are grouped by domain. It consists of error bundles. An error bundle contains multiple error instances, and an associated metadata file that describes static data about the errors such as, the organization, domain, category, severity, etc. Tooling is provided to help create or update an error instance in a particular bundle of an ErrorLibrary, as well as creating and managing the bundle and the library itself. Further, tooling can help choose a particular error to be included in a service implementation.

As already mentioned, instances of errors can be managed in the Error library, except for Cause/Detail string and message parameters. Every other aspect of the base error message is statically defined for any given instance of the error message in a particular embodiment. However, not every part of the error needs to be localized. A particular embodiment can localize the error message string and resolution string. The remainder of the data for a particular error doesn't need to be localized. For localization, one option is to use the standard Property Resource Bundle approach, available as part of the standard Java Developer's Kit (JDK). To avoid the overhead and repetition, a particular embodiment can split the error information so that we only keep the localizable information in the properties file of the Resource Bundle and keep the non-localizable static information in a separate metadata file. The resource properties files and the metadata file forms a bundle for a error domain. This is called an Error Bundle. In addition to the standard resource bundle mechanism, a particular embodiment may support other pluggable localization mechanisms, to store the localizable part of the ErrorData. This pluggability is abstracted through an ErrorProvider interface. The different implementations of this interface are called Error providers.

For example, if we have a Properties Resource Bundle for errors from System domain, we can have the following files, with example content in the files as described below.
SystemErrors_en.properties
errorName1="Error Message in English for error 1", "Error Resolution in English for error 1"
errorName2="Error Message in English for error 2", "Error Resolution in English for error 2"
SystemErrors_de.properties
errorName1="Error Message in German for error 1", "Error Resolution in German for error 1"
errorName2="Error Message in German for error 2", "Error Resolution in German for error 2"
Application_TradingErrors_en.properties
errorName3="Error Message in English for error 3", "Error Resolution in English for error 3"
errorName4="Error Message in English for error 4", "Error Resolution in English for error 4"

These property resource bundles, along with the metadata file that contains the static information (e.g., category, severity, etc., for a given error), is what is included in an error library of an example embodiment. In a particular embodiment, the metadata file is expressed in XML. The build artifact for an error library can be a Standard Java Archive file (jar file), so the file can be loaded using the standard mechanisms.

A single error library can contain multiple Resource bundles, one per domain. Each Resource Bundle. On the other hand, we can also create a separate error library for each of these. There is no restriction either on the model or on the tooling to do it one way or another.

In order to efficiently locate the appropriate resource bundle and load it at runtime, certain conventions can be followed for the names of the Resource Bundles. The name can be <CategoryName_DomainNamelanguage.properties> in a particular embodiment. Tooling can add the required error libraries as a dependency for the service implementation and client projects.

A particular embodiment can provide a utility function to service developers to use an error instance (i.e., a new ErrorData) at runtime, when they want to include such error in their response or otherwise. This utility function can take the information like error category, optional domain name, and an error id. Based on this information, the utility function can look up the appropriate Resource Bundle and create and populate an ErrorData instance and return. In the case of custom error data type, any additional fields are expected to be filled in by the application code. Custom error fields are not managed inside the error library.

Error Grouping

An example embodiment includes the ability to group certain errors together for management and tracking purposes. For example, all authentication-related errors may be grouped together. Errors like, invalid token, token expired, temporarily blocked, etc. may also be separately grouped A metric may be defined to collect the total number of errors for a given group. The framework itself may not come up with the group definition or its constituents; but, we can help service developers to define such groups and we can have a metric automatically registered for that group at initialization time and collect data for that group.

Error group names are strings and are unique within an error library. So the combination of error library name and the group name can be globally unique. The metric that is auto-registered can be this name to avoid collisions.

Tooling

An Eclipse plugin can provide functionality to create and manage error libraries and ErrorData instances in them. Several actions can be supported by this plugin.

Creating a New Error Library

Figure 4:
FIG. 4 illustrates a user interface for creating a new Error Library in an example embodiment.
Figure 5:
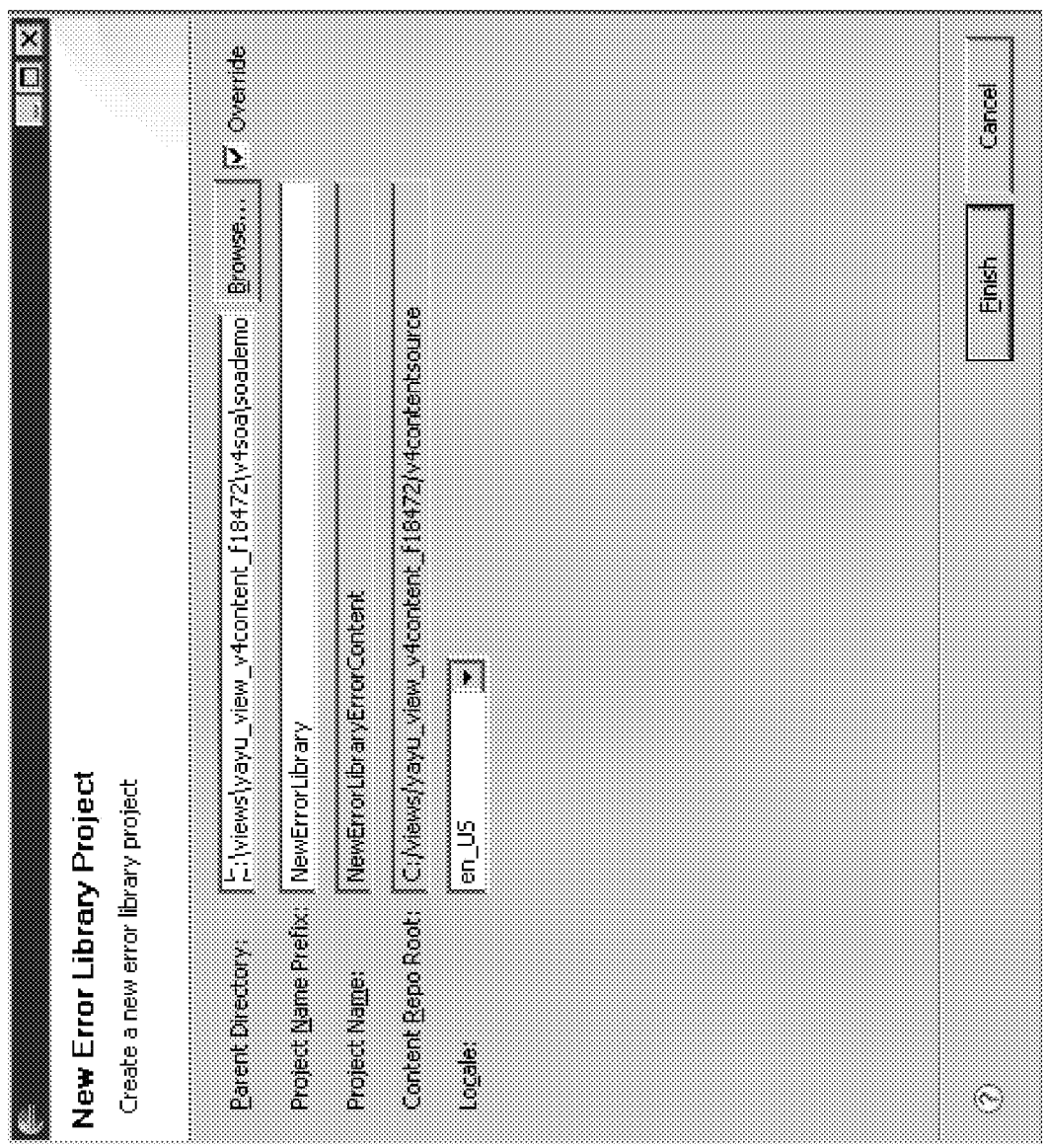
FIG. 5 illustrates the Error Library creation wizard in an example embodiment.
Figure 6:
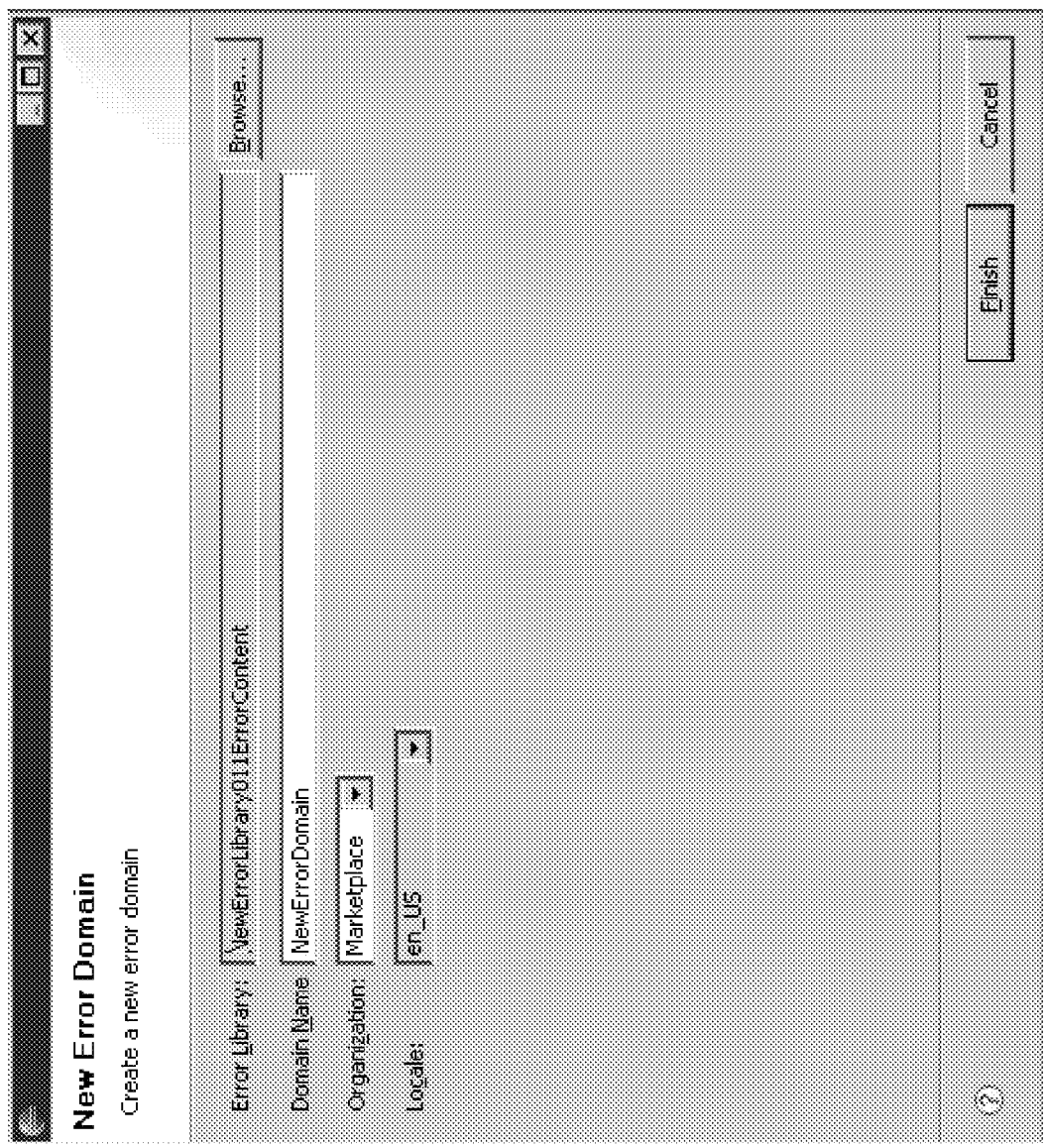
FIG. 6 illustrates an example embodiment for creating an error domain.

This Error Library plugin action can ask for the name of the new error library. For example, see FIGS. 4-6. The new error library structure is then created in the workspace with the given name.

Creating a New Error Bundle

A new error bundle is implicitly created when a new error is created with a new category and domain combination, that doesn't already exist. No explicit menu item is needed for this. An Error bundle is a combination of a property resource bundle and the corresponding meta data file.

Creating a New Error

This Error Library plugin action can ask for all the fields in ErrorData (except for the ID) or its derived type, in addition to the name of the library, and insert a new record in the corresponding metadata file and the Resource Bundle. The Error ID can be generated using the ID generator interface and the mechanism described above. For example, see FIG. 7.

Error Library Search

Figure 8:
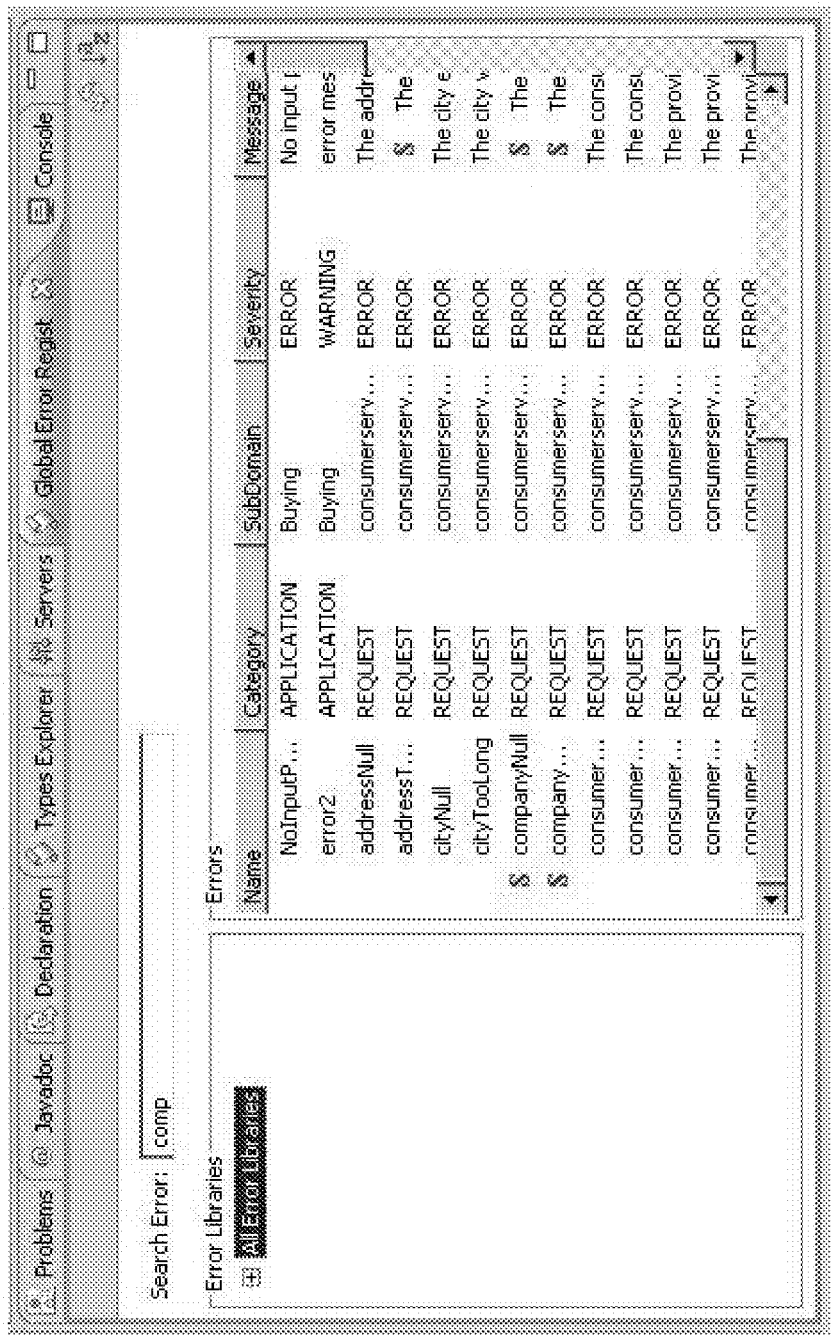
FIG. 8 illustrates an example of the search wizard in the content plugin in an example embodiment.

A particular embodiment can provide a search menu for error searching. An error search can be based on name, category, domain, or description. The search feature can refer to tooling support required to find/group errors by various criteria. These criteria can include the following:
Search by error ID
Search by error name
Search by category name
Search by domain
Search by description The error library search functionality can be based on a standard content search model. For example, see FIG. 8.

Editing Existing Errors

Error editing can be done by either directly opening up the error library bundle, if the project is already loaded, or one can start with a search and double click on the search results, which can automatically load the error library and allow editing of the error. Only the error string and the resolution string can be edited. Other fields shouldn't be editable. Errors shouldn't be deletable, once they are created in the error library.

Adding New Domains or Sub-Domains

We don't need any special tooling support for adding new domains or sub-domains. As part of adding a new error instance, the pop-up user interface can prompt for domain, sub-domain, etc. For example, see FIG. 7. If bundles for the specified domain or sub-domain are not currently there (e.g., because of the naming convention of the resource bundle, for example), the tooling can automatically create corresponding bundles. A bundle for a given category and domain can only exist in one error library. This check can be done by the tooling.

Creating Errors for Custom Error Types

Because service developers can define their custom error types, extending from ErrorData, the tooling can support creating and managing custom errors that correspond to this custom type as well. To keep the process consistent, whether the errors exactly follow ErrorData or whether they are derived from ErrorData, the information about what is the error type is kept in the error library itself.

Creating Error Groups

Sometimes, one may want to group certain errors together for reporting purpose. Examples include authentication errors within security domain. A particular embodiment provides a menu item to group certain errors together.

Java Utility to Obtain ErrorData for the Service (getErrorData)

Ultimately, the errors defined in the error library must manifest themselves in code some way so that the service implementation can create and send those errors to the callers. A particular embodiment may provide an application programming interface (API) that obtains the error in a way that is independent of the Error providers. Below is the interface definition of an example embodiment that illustrates the interaction points between the application developer and SOA error runtime.

```
/**
 * ErrorDataKey is the structure that is used as a key to look up in the ErrorDataProvider.
 */
  public static class ErrorDataKey {
     private String bundleName;    /** bundle name */
     private String errorName;     /** error name */
     private long id;              /** error id */
     private Map additionalKeys;   /** This map is a placeholder for extensibility purposes */
  }
interface ErrorDataProvider
{
  /**
   * @param key
   * @param args
   * @return an ErrorData based on the key/args values
   */
  public ErrorData getErrorData( ErrorDataKey key, Object[ ] args );
  /**
   * Allows construction of a "custom" ErrorData
   * @param key
   * @param args
   * @param clazz Class type that can be constructed and returned
   * @return a "custom" ErrorData
   */
  public <T extends ErrorData> T getCustomErrorData( ErrorDataKey key, Object[ ] args, Class<T>
clazz );
}
```

Here is some sample code illustrating usage of the API's.

```
ErrorDataKey key = new ErrorDataKey( );
key.setLibraryName( "SearchDomainErrorLibrary" );
key.setBundleName( "SearchDomain" );
key.setErrorName( "insufficient_arguments " );
ErrorDataProvider provider =
ErrorDataProviderFactory.getProvider( );
errorData = provider.getErrorData( key, new Object[ ] { "foo" }
);
```

The Error Library Jar

Each error library can be packaged as a library jar file. For an application to access this content, the application project is required to introduce a dependency on each error library they require.

As described herein, according to various example embodiments, there is provided a computer-implemented system and method for the definition, creation, management, transmission, and monitoring of errors in a SOA environment. The error processing system provides several features as listed below:

The management (creation, modification, unique identification) of individual error instances for specific services.

The storage and management of content (localizable static content and any associated metadata) associated with these error instances.

The creation of runtime ErrorData instances that contain dynamic error message parameters and static data.

Provisions for transmitting the runtime errors as system exceptions, such as SOAP faults, or as application errors, which are contained in normal operation response messages.

Provisions for automatically identifying and collecting error metrics regardless how there are transmitted.

Figure 12:
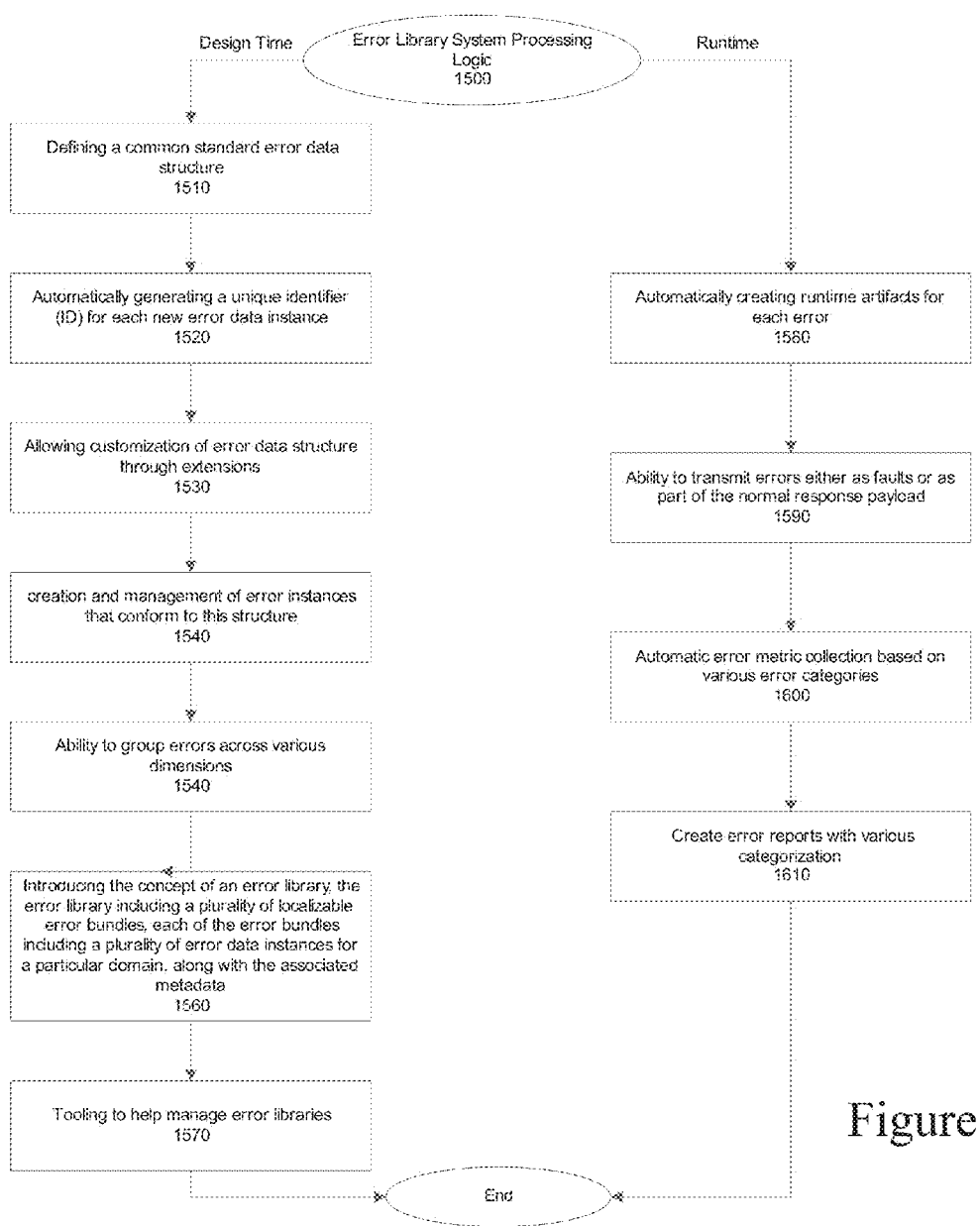
FIG. 12 illustrates a processing flow diagram for an example embodiment.

FIG. 12 is a processing flow chart illustrating an example embodiment of the error library processing system 1500 as described herein. The method in an example embodiment includes: defining a common standard error data structure; automatically generating a unique identifier (ID) for each new error data instance; allowing customization of error data structure through extensions; creation and management of error instances that conform to this structure; ability to group errors across various dimensions; introducing the concept of an error library, the error library including a plurality of localizable error bundles, each of the error bundles including a plurality of error data instances for a particular domain, along with the associated metadata; automatically creating runtime artifacts for each error; ability to transmit errors either as faults or as part of the normal response payload; automatic error metric collection based on various error categories, and finally, tooling to help manage error libraries and reporting errors.

Figure 13:
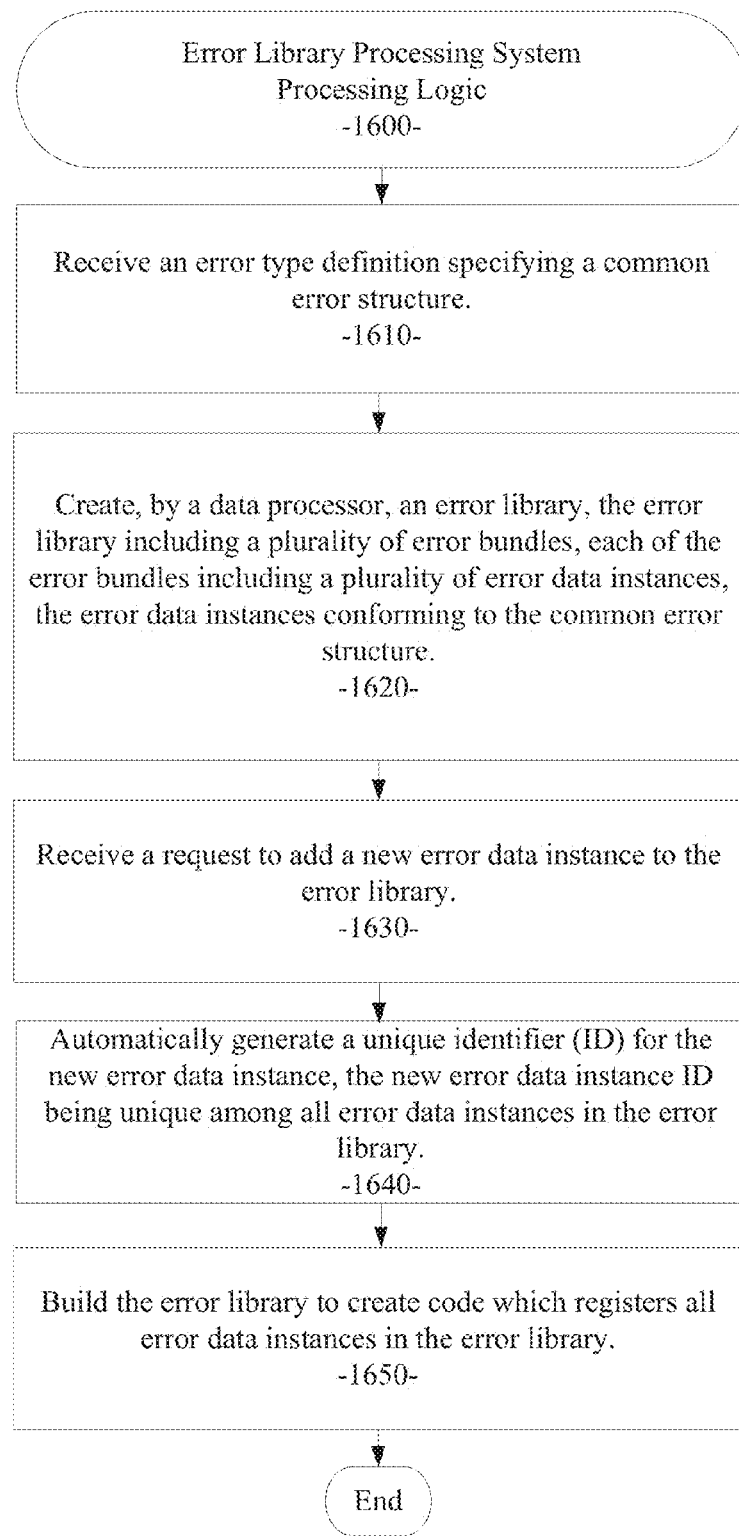
FIG. 13 illustrates a processing flow diagram for an example embodiment.

FIG. 13 is a processing flow chart illustrating another example embodiment of the error library processing system 1600 as described herein. The method of an example embodiment includes: receiving an error type definition specifying a common error structure (processing block 1610); creating, by a data processor, an error library, the error library including a plurality of error bundles, each of the error bundles including a plurality of error data instances, the error data instances conforming to the common error structure (processing block 1620); receiving a request to add a new error data instance to the error library (processing block 1630); automatically generating a unique identifier (ID) for the new error data instance, the new error data instance ID being unique among all error data instances in the error library (processing block 1640); and building the error library to create code which registers all error data instances in the error library (processing block 1650).

Figure 14:
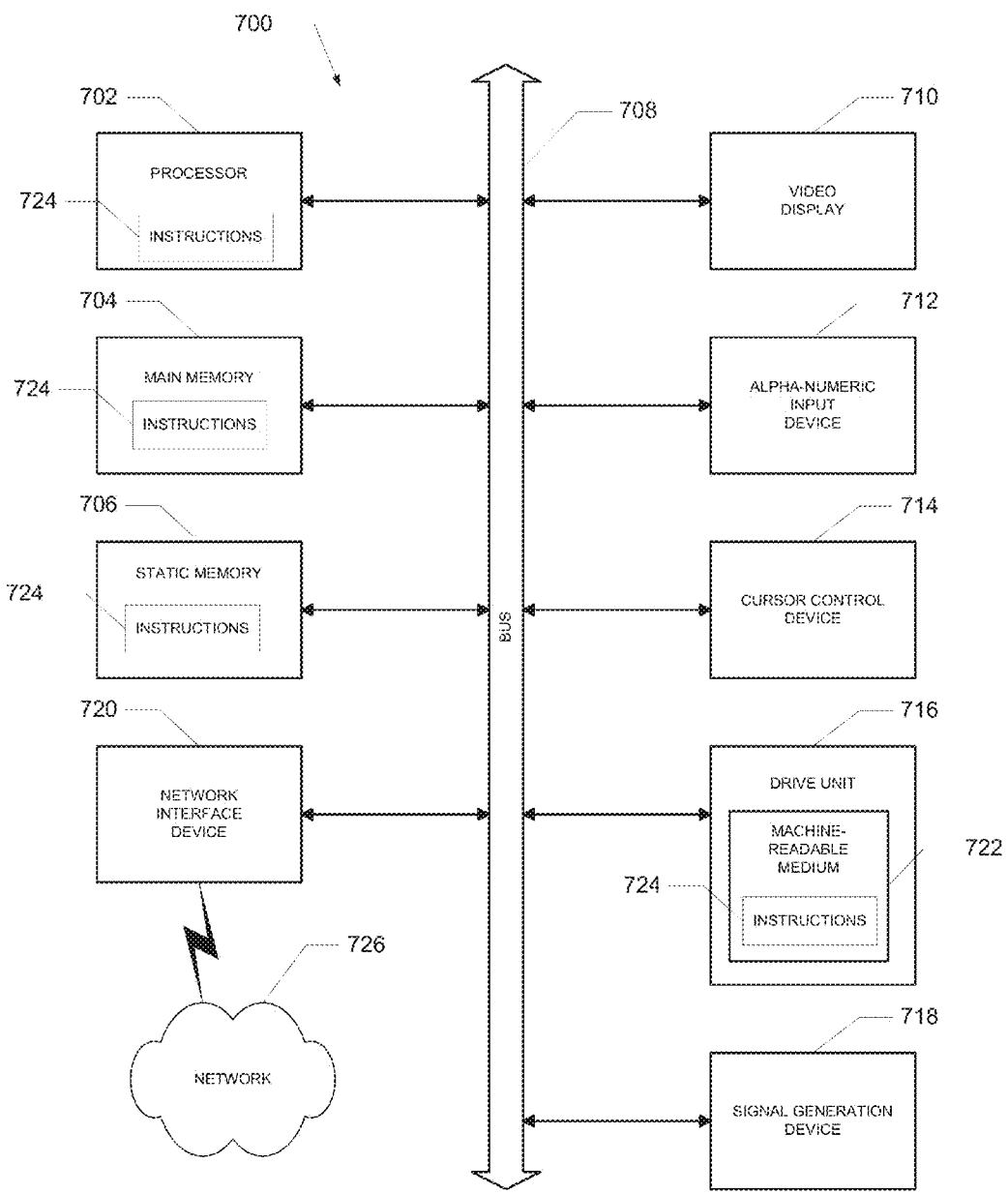

FIG. 14 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media, and carrier wave signals. As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived there from, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, a computer-implemented system and method for the definition, creation, management, transmission, and monitoring of errors in a SOA environment are disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

What is claimed is:

1. A method for managing error messages across multiple services, comprising:

for each of a plurality of runtime errors, creating a respective error message instance conforming to a standard error message definition common among the multiple services;

for at least one runtime error associated with at least one of the services, creating an extension to the respective error message instance, the extension being customized to the at least one service; and transmitting some of the error message instances as faults and transmitting some of the error message instances as part of a response payload.

2. The method of claim 1, wherein the error message instances include dynamic error message parameters and static data.

3. The method of claim 2, wherein the error message parameters are localizable.

4. The method of claim 2, wherein the error message instances are created in an error library that is organized into error bundles, each bundle comprising at least one resource property file comprising a dynamic error message and a metadata file comprising the static data.

5. The method of claim 1, wherein creating an error message instance comprises generating a unique identifier for the error message instance.

6. The method of claim 1, further comprising collecting error metrics for at least some of the error message instances.

7. The method of claim 1, further comprising mapping the error message instances conforming to the standard error message definition to error messages conforming to a legacy error format.

8. The method of claim 1, further comprising logging at least some of the error message instances.

9. The method of claim 1, further comprising grouping errors across at least one of a plurality of dimensions.

10. A system for managing error messages across multiple services, comprising:

a processor and memory storing instructions executable by the processor, execution of the instructions causing creation, for each of a plurality of runtime errors, of a respective error message instance conforming to a standard error message definition common among the multiple services;

for at least one runtime error associated with at least one of the services, creation of an extension to the respective error message instance, the extension being customized to the service; and transmission of some of the error message instances as faults and transmission of some of the error message instances as part of a response payload.

11. The system of claim 10, wherein the error message instances include dynamic error message parameters and static data.

12. The system of claim 10, wherein the memory further stores an error library, the library storing the error message instances following creation thereof.

13. The system of claim 12, wherein the error library is organized into error bundles, each bundle comprising at least one resource property file comprising a dynamic error message and a metadata file comprising the static data.

14. The system of claim 13, wherein the error library comprises multiple error bundles for multiple corresponding domains.

15. The system of claim 12, wherein the common error message definition further includes a field for at least one of an error name, a name of an organization from which the error originates, an error category, a domain within the organization from which the error originates, an error severity, an error message, an error resolution proposal, an error cause, or an exception name.

16. The system of claim 15, wherein the library is organized into error groups defined based on at least one of the fields.

17. The system of claim 10, wherein the common error message definition includes a field for a unique error identifier, the instruction comprising an error-identifier generation interface causing the processor to generate the unique error identifier when creating the error message instance.

18. The system of claim 17, wherein the error-identifier generation interface is configured to call a database sequence generator.

19. An article of manufacture comprising a non-transitory machine-readable storage medium having, embedded thereon, machine-executable instructions which, in response to execution by a machine, cause the machine to:

create, for each of a plurality of runtime errors, a respective error message instance conforming to a standard error message definition common among the multiple services;

create, for at least one runtime error associated with at least one of the services, an extension to the respective error message instance, the extension being customized to the service transmitting some of the error message instances as faults and transmitting some of the error message instances as part of a response payload.

* * * * *